(No Model.)
E. HUBER.
BELT TIGHTENER FOR THRASHING MACHINES.
No. 481,176. Patented Aug. 23, 1892.
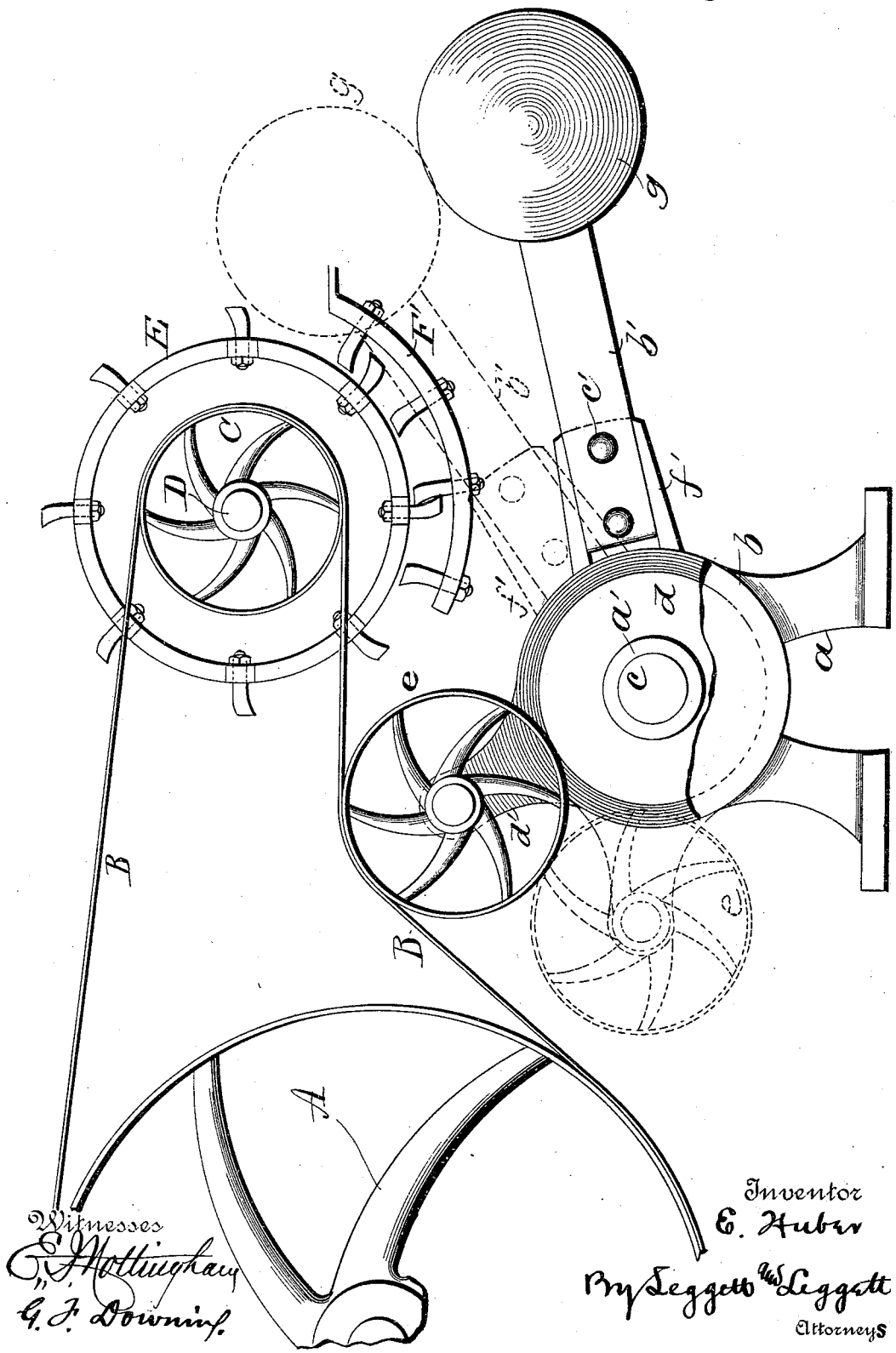
Witnesses
E. Nottingham
G. F. Downing
Inventor
E. Huber
By Leggett & Leggett
Attorneys

United States Patent Office.

EDWARD HUBER, OF MARION, OHIO.

BELT-TIGHTENER FOR THRASHING-MACHINES.

SPECIFICATION forming part of Letters Patent No. 481,176, dated August 23, 1892.

Application filed February 1, 1892. Serial No. 419,951. (No model.)

*To all whom it may concern:*

Be it known that I, EDWARD HUBER, a resident of Marion, in the county of Marion and State of Ohio, have invented certain new and useful Improvements in Thrashing-Machines; and I do hereby declare the following to be a full, clear, and exact description of the invention, such as will enable others skilled in the art to which it appertains to make and use the same.

My invention relates to an improvement in belt-tighteners for thrashing-machines, the object being to so construct the machine that the belt which transmits motion to the cylinder shall be maintained at all times at the proper tension.

A further object is to construct a belt-tightener for a thrashing-machine so that it shall be automatic in its operation and so that a broad bearing shall be provided for the moving parts, thus preventing wabbling or lateral movement of the parts.

With these objects in view the invention consists in certain novel features of construction and combinations and arrangements of parts, as hereinafter set forth, and pointed out in the claim.

The accompanying drawing illustrates my improvements.

A represents the drive-wheel of a thrashing-machine, over which a belt B passes, said belt also passing over a pulley C on the shaft D of the thrashing-cylinder E, and beneath the thrashing-cylinder E the toothed concave F' is located. A stand is represented at $a$, said stand being adapted to support a disk $b$, from the center of which a pin or journal $c$ projects laterally. Another disk $d$ is placed parallel with the face of the disk $b$ and is provided with an opening $a'$ for the reception of the pin or journal $c$, on which said disk $d$ is adapted to have an oscillatory movement. Projecting from the disk $d$ is an arm $d'$, at the free end of which a pulley or band-wheel $e$ is mounted. The wheel $e$ is intended to bear against and run idly on the band B. Projecting from the disk $d$ at or near right angles to the arm $d'$ is a socketed arm $f'$, into which the end of the shank $b'$ of a weight $g$ is inserted and secured by means of fastening devices $c'$. Thus it will be seen that the idle-pulley $e$ will be automatically pressed against the driving-belt B at all times with a yielding pressure, thus maintaining said belt at all times at the proper tension.

By providing two disks $b\ d$, placed in close proximity to each other and connected by the journal $c$, mounting an idle-pulley on an arm carried by one of said disks, and connecting a weight with another arm projecting from the same disk at right angles to the arm which carries the idle-pulley a belt-tightener for thrashing-machines will be produced which will be very simple in construction, effectual in the performance of its functions, and one which (on account of the broad bearing between the disks) will be prevented from wabbling or lateral motion.

Having fully described my invention, what I claim as new, and desire to secure by Letters Patent, is—

A belt-tightener consisting, essentially, of a stationary plate or disk having a flat inner face adapted to form an extended bearing and provided centrally with a pin or journal, a corresponding movable plate or disk provided, also, with a flat inner face adapted to engage and have an extended bearing upon the inner face of the stationary plate or disk, said movable plate or disk having an opening which receives the pin or journal of the stationary plate or disk, whereby the movable plate or disk has an axial bearing and a bearing at right angles to the axle, an arm on the movable plate or disk, supporting an idle pulley or wheel adapted to bear on the belt, a weight-arm approximately at right angles to the wheel or pulley supporting arm, and a weight having a shank secured to the weight-arm, substantially as set forth.

In testimony whereof I have signed this specification in the presence of two subscribing witnesses.

EDWARD HUBER.

Witnesses:
 W. LINDER,
 JOHN J. CRAWLEY.